(12) United States Patent
Higuchi et al.

(10) Patent No.: US 8,173,557 B2
(45) Date of Patent: May 8, 2012

(54) LAMINATED SHEET

(75) Inventors: Yoshiaki Higuchi, Chiyoda-ku (JP); Takuya Nakao, Chiyoda-ku (JP); Sho Masuda, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 393 days.

(21) Appl. No.: 12/538,901

(22) Filed: Aug. 11, 2009

(65) Prior Publication Data

US 2009/0297815 A1   Dec. 3, 2009

Related U.S. Application Data

(63) Continuation of application No. PCT/JP2008/052888, filed on Feb. 20, 2008.

(30) Foreign Application Priority Data

Feb. 21, 2007   (JP) .................. 2007-040615

(51) Int. Cl.
   *B32B 27/12*   (2006.01)
(52) U.S. Cl. ............ 442/286; 442/85; 442/86; 442/289; 442/394; 442/397
(58) Field of Classification Search ............... 442/85, 442/86, 286, 289, 394, 397
See application file for complete search history.

(56) References Cited

U.S. PATENT DOCUMENTS

| | | | | |
|---|---|---|---|---|
| 4,960,827 A | * | 10/1990 | Miyazaki et al. | 525/131 |
| 6,461,719 B1 | * | 10/2002 | Ichikuni et al. | 428/147 |
| 2005/0191450 A1 | * | 9/2005 | Ishisaki | 428/35.2 |

FOREIGN PATENT DOCUMENTS

| | | |
|---|---|---|
| EP | 1 629 972 A1 | 3/2006 |
| JP | 57034107 A | 2/1982 |
| JP | 61-61849 | 3/1986 |
| JP | 63199770 A | 8/1988 |
| JP | 5-3826 | 1/1993 |
| JP | 7156340 A | 6/1995 |
| JP | 2001225423 A | 8/2001 |
| JP | 2003105253 A | 4/2003 |

* cited by examiner

*Primary Examiner* — Andrew Piziali
(74) *Attorney, Agent, or Firm* — Oblon, Spivak, McClelland, Maier & Neustadt, L.L.P.

(57) ABSTRACT

A laminated sheet comprising a woven or nonwoven fabric comprising glass fibers fixed by a binder, and a fluororesin film laminated on each other, wherein the binder contains a copolymer (A) having repeating units (a1) based on at least one fluoromonomer selected from the group consisting of tetrafluoroethylene, chlorotrifluoroethylene and hexafluoropropylene, and repeating units (a2) based on at least one non-fluoromonomer selected from the group consisting of a vinyl ether, a vinyl ester, an isopropenyl ether, an isopropenyl ester, an allyl ether and an allyl ester.

12 Claims, 1 Drawing Sheet

LAMINATED SHEET

TECHNICAL FIELD

The present invention relates to a laminated sheet comprising a woven or nonwoven fabric comprising glass fibers fixed by a binder and a fluororesin film.

BACKGROUND ART

Heretofore, as a covering material for agricultural greenhouses, a fluororesin film such as an ethylene/tetrafluoroethylene copolymer (ETFE) film, which is excellent in durability, transparency, strength, etc., has been used.

In recent years, the application of a fluororesin film expands to film structures other than the covering material for agricultural greenhouses, for example, a roof material of large-scale greenhouses and atria, an exterior wall and a roof material of sports facilities, etc., on the basis of its performance.

Such a film structure is employed mainly in Europe, Chine, etc. at the present stage, but in the other countries, it has not substantially been employed at present due to the difference in the fire protection standard. Particularly in Japan, a non-reinforced resin film has not been allowed as a building material by the Building Standards Law of Japan, since the film is burned out by 6 cm square fire as stipulated in the fire test.

Further, to build a large-scale film structure in Japan, a design considering the wind speed in the typhoon or the monsoon in winter is inevitable, but of the fluororesin film at present, the strength is insufficient. Accordingly, consideration is required such that the distance between supports of a panel which supports the film is shortened, the thickness of the film is increased, or several layers of films are overlaid, and accordingly the degree of freedom in the design and advantages in the building cost may not be made use of.

On the other hand, heretofore, a laminated sheet comprising a resin film laminated on cloth made of glass fibers (hereinafter referred to as glass fiber cloth) has been used in various fields.

As the glass fiber cloth, a woven or nonwoven fabric comprising glass fibers has been commonly used. Further, the woven or nonwoven fabric usually has a binder (paste) treatment applied so as to prevent slippage of the glass fibers. As the material for the binder, a solution or a dispersion of a melamine resin, an acrylic-melamine resin, an acrylic resin, an ethylene/vinyl acetate resin or the like is commercially available.

Further, particularly for building application, as the resin film, a fluororesin film which is excellent in weather resistance, stain resistance, water resistance, etc. is widely used.

For example, Patent Document 1 discloses an incombustible sheet comprising a fluororesin film melt-pasted on incombustible cloth such as a glass fiber cloth.

Further, Patent Document 2 discloses a waterproof cloth comprising a fluororesin film fused and bonded to a base cloth obtained by twisting composite yarn obtained by impregnating multifilament yarn comprising glass fibers having a diameter of 6 microns or smaller with a fluororesin such as polytetrafluoroethylene (PTFE) or polyvinylidene fluoride in a predetermined amount, followed by firing.

Patent Document 1: JP-A-61-61849
Patent Document 2: JP-B-5-3826

DISCLOSURE OF THE INVENTION

Object to be Accomplished by the Invention

However, if the laminated sheet as disclosed in the above Patent Documents is used as a covering material for agricultural greenhouses or as another film structure, its transparency may decrease since the transparency of the glass fiber bundle itself is low.

As a means to improve transparency, it is considered to increase the open area ratio of the glass fiber cloth. However, if the open area ratio is increased, the strength to maintain the structure of the glass fiber cloth itself may decrease. For a glass fiber cloth of which the open area ratio is increased to overcome the above problem, a binder to fix the glass fibers is required. However, a commonly used binder such as an acrylic-melamine resin cannot withstand long time use in an environment where it is exposed to sunlight, since discoloration, desorption or the like will occur. On the other hand, polyvinylidene fluoride is insufficient in the adhesive power as a binder. That is, a glass fiber cloth using a polyvinylidene fluoride as a binder, when supplied to a heated roll laminator to be laminated and bonded with a fluororesin film, cannot absorb deformation at the guide roller portion, whereby deformation of the cloth (misalignment) occurs in many cases.

Under these circumstances, the present invention has been made and the object is to provide a laminated sheet, which has high transparency and withstands long outdoor use, comprising a glass fiber cloth which is free from deformation of the cloth even in a step of bonding the cloth to a fluororesin film.

Means to Accomplish the Object

The present inventors have conducted extensive studies and as a result, found that the binder to fix the glass fiber cloth is one cause of the decrease in the durability of the laminated sheet. That is, the above-described commercially available binder has low durability and its adhesive power decreases with time, and accordingly the durability of the laminated sheet is poor. Further, in the waterproof cloth as disclosed in Patent Document 2, it is considered that PTFE, a polyvinylidene fluoride, etc. function as the binder, but according to studies by the present inventors, such a fluororesin has low adhesive properties, and its adhesive properties are lost in drying procedure particularly in the binder treatment, whereby the intersection points of the glass fibers are not fixed at the time of deformation in processing and fixing. Accordingly, there is no problem in the case of a glass fiber cloth with a low open area ratio, but in the case of a glass fiber cloth with a high open area ratio, it is difficult to maintain the shape of the woven or nonwoven fabric, and formation of a laminated sheet itself is difficult.

Under these circumstances, the present inventors have conducted further studies and as a result, found that a binder containing a fluorocopolymer having at least two types of repeating units based on a specific monomer has adhesive properties which maintain the shape of the cloth even when dried and has flexibility capable of following the deformation, and is excellent also in durability, and accomplished the present invention.

The present invention provides the following.

(1) A laminated sheet comprising a woven or nonwoven fabric comprising glass fibers fixed by a binder, and a fluororesin film laminated on each other, wherein the binder contains a copolymer (A) having repeating units (a1) based on at least one fluoromonomer selected from the group consisting of tetrafluoroethylene, chlorotrifluoroethylene and hexafluoropropylene, and repeating units (a2) based on at least one non-fluoromonomer selected from the group consisting of a vinyl ether, a vinyl ester, an isopropenyl ether, an isopropenyl ester, an allyl ether and an allyl ester.

(2) The laminated sheet according to (1), wherein the fiber thickness of the glass fibers is from 5 to 3,000 tex, and the open area ratio of the woven or nonwoven fabric is at least 30%.

(3) The laminated sheet according to (1) or (2), wherein the fluororesin film comprises at least one fluororesin selected from the group consisting of an ethylene/tetrafluoroethylene copolymer, a tetrafluoroethylene/perfluoro(alkyl vinyl ether) copolymer, a tetrafluoroethylene/hexafluoropropylene copolymer, polyvinylidene fluoride, polyvinyl fluoride, a tetrafluoroethylene/hexafluoropropylene/vinylidene fluoride copolymer and polychlorotrifluoroethylene.

(4) The laminated sheet according to any one of (1) to (3), wherein the fluororesin film is an ethylene/tetrafluoroethylene copolymer.

(5) The laminated sheet according to any one of (1) to (4), which has a light transmittance in the visible region (visible light transmittance) of at least 30%.

(6) The laminated sheet according to any one of (1) to (5), wherein the hydroxyl value or the acid value as calculated as mg of potassium hydroxide consumed per 1 g of the copolymer (A) is from 2 to 60 mgKOH/g.

(7) The laminated sheet according to any one of (1) to (6), wherein the ratio of the repeating units (a1) in the copolymer (A) is from 30 to 70 mol % based on the total amount of all the repeating units constituting the copolymer (A).

(8) The laminated sheet according to any one of (1) to (7), wherein the ratio of the repeating units (a2) in the copolymer (A) is from 30 to 70 mol % based on the total amount of all the repeating units constituting the copolymer (A).

(9) The laminated sheet according to any one of (1) to (8), wherein the amount of the binder in the glass fibers is from 5 to 30 mass %.

(10) The laminated sheet according to any one of (1) to (9), which has a thickness of from 24 to 1,000 μm.

(11) The laminated sheet according to any one of (1) to (10), which is produced by laminating the woven or nonwoven fabric and the fluororesin film on each other under heating.

(12) The laminated sheet according to (11), wherein the heating temperature is from 150 to 400° C.

EFFECTS OF THE INVENTION

According to the present invention, a laminated sheet comprising a glass fiber cloth which has high transparency, which withstands long outdoor use and which is free from deformation of the cloth even in a step of bonding the cloth to a fluororesin film, can be provided.

MEANINGS OF SYMBOLS

Figure 1:
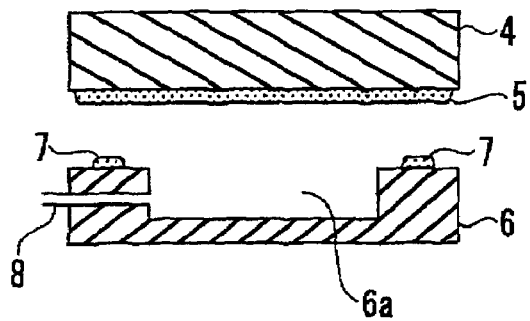
FIG. 1 is a vertical cross-section schematically illustrating a fixing frame used in Examples.

4: Upper frame, 5: packing, 6: lower frame, 7: packing, 8: piping

BEST MODE FOR CARRYING OUT THE INVENTION

The laminated sheet of the present invention comprises a woven or nonwoven fabric comprising glass fibers fixed by a binder (hereinafter sometimes referred to as a fixed glass fiber cloth) and a fluororesin film laminated on each other.

In the fixed glass fiber cloth to be used in the laminated sheet of the present invention, the binder to fix the glass fibers contains a copolymer (A) having specific repeating units (a1) and specific repeating units (a2).

The repeating units (a1) are repeating units based on at least one fluoromonomer selected from the group consisting of tetrafluoroethylene, chlorotrifluoroethylene and hexafluoropropylene.

The repeating units (a1) are preferably repeating units based on chlorotrifluoroethylene among them.

The ratio of the repeating units (a1) in the copolymer (A) is preferably from 30 to 70 mol %, more preferably from 40 to 60 mol % based on the total amount of all the repeating units constituting the copolymer (A). When the ratio of the repeating units (a1) is at least 30 mol %, durability of a laminated sheet to be obtained, adhesive properties to the fluororesin film, etc. will improve. Further, when it is at most 70 mol %, favorable balance with the repeating units (a2) will be achieved, and excellent adhesive properties as a binder will be obtained. Further, transparency, etc. will improve.

The repeating units (a2) are repeating units based on at least one non-fluoromonomer selected from the group consisting of a vinyl ether, a vinyl ester, an isopropenyl ether, an isopropenyl ester, an allyl ether and an allyl ester.

The vinyl ether may, for example, be a compound (1) represented by the following formula (1):

$$CH_2=CH-OR^1 \qquad (1)$$

wherein $R^1$ is an alkyl group, a hydroxyalkyl group, a group having a nonionic hydrophilic group or a group having an epoxy group.

In the present specification, an alkyl group means a monovalent saturated hydrocarbon group, and includes a linear alkyl group, a branched alkyl group, a cyclic alkyl group and a combination thereof (for example, a group having a hydrogen atom in a linear or branched alkyl group substituted by a cyclic alkyl group, a group having a hydrogen atom in a cyclic alkyl group substituted by a linear or branched alkyl group).

The alkyl group is preferably a $C_{1-10}$ liner, branched or cyclic alkyl group, such as a methyl group, an ethyl group, a (n-, iso-)propyl group, a (n-, iso-, tert-)butyl group, a 2-ethyl-n-hexyl group, a n-nonyl group, a cyclohexyl group or a methylcyclohexylmethyl group.

By use of the compound (1) wherein $R^1$ is an alkyl group as the monomer, strength, durability, etc. of the copolymer (A) will improve.

The hydroxyalkyl group may be a group having at least one hydrogen atom in the above alkyl group substituted by a hydroxyl group.

By use of the compound (1) wherein $R^1$ is a hydroxylalkyl group as the monomer, the copolymer (A) is one having hydroxyl groups, whereby the copolymer (A) is likely to be adsorbed in the glass fibers, and its function as a binder will improve.

The group having a nonionic hydrophilic group is a hydrophilic group which is not charged in water, and by the copolymer (A) having such hydrophilic groups, mechanical and chemical stability when the copolymer (A) is formed into an aqueous dispersion will improve.

The group having a nonionic hydrophilic group may, for example, be a poly(oxyalkylene) group having two or more oxyalkylene groups such as an oxyethylene group or an oxypropylene group.

The group having an epoxy group may, for example, be a glycidyl group.

The compound (1) may, for example, be specifically an alkyl vinyl ether such as ethyl vinyl ether, (n-, iso-, tert-)butyl vinyl ether or cyclohexyl vinyl ether; a hydroxyalkyl vinyl ether such as hydroxybutyl vinyl ether, hydroxyethyl vinyl ether, cyclohexanedimethanol monovinyl ether ($CH_2=CHO-CH_2\text{-cyclo}C_6H_{10}-CH_2OH$) or hydroxynonyl ether ($CH_2=CHOC_9H_{18}OH$); a vinyl ether having a nonionic hydrophilic group such as an alkylene oxide adduct having an alkylene oxide (such as ethylene oxide or propylene oxide) added to a hydroxyl group of the above hydroxyalkyl vinyl ether; or glycidyl vinyl ether.

The vinyl ester may, for example, be a compound (2) represented by the following formula (2):

$$CH_2=CH-O-CO-R^2 \qquad (2)$$

wherein $R^2$ is the same as $R^1$.

The compound (2) may, for example, be specifically a fatty acid vinyl ester such as Veova 10 (tradename, manufactured by Shell Kageku K.K.) having a branched alkyl group, vinyl lactate, vinyl acetate, vinyl pivalate or vinyl decanoate.

The isopropenyl ether may, for example, be a compound (3) represented by the following formula (3):

$$CH_2=C(CH_3)-O-R^3 \qquad (3)$$

wherein $R^3$ is the same as $R^1$.

The compound (3) may, for example, be an alkyl isopropenyl ether such as 2-methoxypropene.

The isopropenyl ester may, for example, be a compound (4) represented by the following formula (4):

$$CH_2=C(CH_3)-O-CO-R^4 \qquad (4)$$

wherein $R^4$ is the same as $R^1$.

The compound (4) may, for example, be specifically an alkyl isopropenyl ester such as isopropenyl acetate.

The allyl ether may, for example, be a compound (5) represented by the following formula (5):

$$CH_2=CH-CH_2-O-R^5 \qquad (5)$$

wherein $R^5$ is the same as $R^1$.

The compound (5) may, for example, be specifically an alkyl allyl ether such as ethyl allyl ether or cyclohexyl allyl ether; a hydroxyalkyl allyl ether such as hydroxybutyl allyl ether or ethylene glycol monoallyl ether; or a glycidyl allyl ether.

The allyl ester may, for example, be a compound (6) represented by the following formula (6):

$$CH_2=CH-CH_2-O-CO-R^6 \qquad (6)$$

wherein $R^6$ is the same as $R^1$.

The compound (6) may, for example, be specifically a fatty acid allyl ester such as allyl propionate or allyl acetate.

The above non-fluoromonomers may be used alone or two or more may be used in combination.

Among the above, preferred is a vinyl ether and/or a vinyl ester in view of excellent copolymerizability with the fluoromonomer, and more preferred is a vinyl ether.

The vinyl ether is particularly preferably an alkyl vinyl ether having a $C_{1-10}$ linear, branched or cyclic alkyl group, cyclohexanedimethanol monovinyl ether or an ethylene oxide adduct of cyclohexanedimethanol monovinyl ether.

Further, the vinyl ester is preferably the above fatty acid vinyl ester.

The ratio of the repeating units (a2) in the copolymer (A) is preferably from 30 to 70 mol %, more preferably from 40 to 60 mol % based on the total amount of all the repeating units constituting the copolymer (A). When the ratio of the repeating units (a2) is at least 30 mol %, the adhesive properties of the copolymer (A) as a binder will improve. Further, when it is at most 70 mol %, favorable balance with the repeating units (a1) will be achieved, and the durability, transparency, etc. of a laminated sheet to be obtained will improve.

The copolymer (A) may have repeating units (a3) other than the repeating units (a1) and the repeating units (a2) within a range not to impair the effects of the present invention.

The repeating units (a3) may be ones based on a monomer copolymerizable with the fluoromonomer and the non-fluoromonomer, and such a monomer may, for example, be an α-olefin such as ethylene, propylene or isobutylene; or an unsaturated carboxylic acid such as crotonic acid or 10-undecenoic acid.

The copolymer (A) preferably has active hydrogen-containing groups as functional groups, whereby the copolymer (A) is likely to be adsorbed on the glass fibers, and the function as a binder will improve. The active hydrogen-containing groups may, for example, be hydroxyl groups, amino groups, amide groups or carboxyl groups.

The copolymer (A) particularly preferably has hydroxyl groups or carboxyl groups, whereby the above effect will be excellent. The content of the hydroxyl groups or the carboxyl groups in the copolymer (A) is preferably such an amount that the hydroxyl value or the acid value (in a case where hydroxyl groups and carboxyl groups are present, the total of the hydroxyl value and the acid value) as calculated as mg of potassium hydroxide consumed per 1 g of the copolymer (A) is from 2 to 60 mgKOH/g, more preferably from 3 to 55 mgKOH/g. When the hydroxyl value or the acid value is at least 2 mgKOH/g, the above effect will be high, and when it is at most 60 mgKOH/g, favorable water resistance will be obtained.

The copolymer (A) may have functional groups other than the active hydrogen-containing groups. Such a functional group may, for example, be an epoxy group, a halogen atom or a group having a double bond. The halogen atom may, for example, be a fluorine atom, a chlorine atom, a bromine atom or an iodine atom. The group having a double bond may, for example, be a vinyl group, an allyl group, a propenyl group, an isopropenyl group, an acryloyl group or a methacryloyl group.

As a method of introducing the above functional groups may be a group of selecting and copolymerizing, as a part of or the entire monomer for the repeating units (a2) and the monomer for the repeating units (a3), a monomer having such a functional group, such as hydroxybutyl vinyl ether, hydroxyethyl vinyl ether, cyclohexanedimethanol monovinyl ether, hydroxybutyl allyl ether, ethylene glycol monoallyl ether, cyclohexanediol monovinyl ether, crotonic acid, undecenoic acid, glycidyl vinyl ether or glycidyl allyl ether.

Further, the functional groups can be introduced also by modifying a copolymer having the repeating units (a1) and the repeating units (a2) and optionally having the repeating units (a3). Specifically, for example, a method wherein as a part of or the entire monomer for the repeating units (a2) and monomer for the repeating units (a3), one having a hydroxyl group or an epoxy group is selected and copolymerized, and a polybasic acid anhydride such as succinic anhydride is reacted with hydroxyl groups or epoxy groups of the obtained copolymer to introduce carboxyl groups, or a method of reacting an isocyanate alkyl methacrylate or the like to introduce groups having a double bond, may be mentioned.

As the copolymer (A), a commercially available product may be used, or the above respective monomers may be copolymerized by a known method.

Commercial products to be used as the copolymer (A) may, for example, be LUMIFLON (tradename, manufactured by Asahi Glass Company, Limited), CEFRAL COAT (tradename, manufactured by Central Glass Co., Ltd.), ZEFFLE (tradename, manufactured by DAIKIN INDUSTRIES, LTD.) or FLUONATE (tradename, manufactured by Dainippon Printing Ink Manufacturing).

A method of copolymerizing the monomers is not particularly limited and may, for example, be emulsion polymerization, suspension polymerization or solution polymerization. Among them, by emulsion polymerization using a monomer having an active hydrogen-containing group, a water-dispersed copolymer (A) will be obtained. Further, by solution polymerization using a monomer having an active hydrogen-containing group, a copolymer (A) in the form of a solution will be obtained. Further, by modifying the functional groups of the copolymer (A) in the form of a solution to an amine salt or the like, phase converting to the copolymer (A) to an aqueous phase and distilling off the solvent, a self-emulsifiable water-dispersed copolymer (A) will be obtained.

The emulsifier to be used for the emulsion polymerization may, for example, be a nonionic emulsifier such as an alkylphenol ethylene oxide adduct, a fatty acid alcohol ethylene oxide adduct or a block copolymer of ethylene oxide and propylene oxide; or an anionic emulsifier such as an alkylbenzene sulfonate, an alkylnaphthalene sulfonate, a higher fatty acid salt, an alkyl sulfate, an alkyl ether sulfate or a phosphate.

Further, a pH adjuster may be added to the aqueous medium. Such a pH adjuster may, for example, be an inorganic base such as potassium carbonate, sodium carbonate, disodium hydrogen orthophosphate, sodium thiosulfate or sodium tetraborate, or an organic base such as triethylamine, triethanolamine, dimethylethanolamine or diethylethanolamine.

The amount of the pH adjuster added is usually from about 0.05 to about 2 parts by mass, preferably from about 0.1 to about 2 parts by mass per 100 parts by mass of the aqueous medium. The polymerization rate tends to be high when the pH is higher.

The emulsion polymerization begins by addition of a polymerization initiator. As the polymerization initiator, a conventional radical initiator may be used, and a water-soluble initiator is preferably employed. Specifically, an inorganic initiator such as a persulfate such as ammonium persulfate, hydrogen peroxide, a redox initiator comprising a combination of the above with a reducing agent such as sodium hydrogen sulfite or sodium thiosulfate, or such a redox initiator with a small amount of iron, a ferrous salt, silver sulfate or the like coexisting; or an organic initiator such as a dibasic acid peroxide such as disuccinic peroxide or diglutaric peroxide, azobisisobutylamidine hydrochloride or azobisisobutylonitrile may, for example, be mentioned.

The amount of use of the polymerization initiator can properly be changed depending on the type, emulsion polymerization conditions and the like, and it is usually preferably from about 0.005 to about 0.5 part by mass per 100 parts by mass of the monomer to be emulsion-polymerized. Further, such a polymerization initiator may be added all at once or may be added dividedly.

The emulsion polymerization starting temperature is properly determined depending on the type of the polymerization initiator, and it is usually preferably from 0 to 100° C., particularly preferably from about 10 to about 90° C. Further, the reaction pressure is properly selected, and it is usually preferably from 0.2 to 10 MPa, particularly preferably from about 0.2 to 5 MPa.

In the above production method, the monomers, and additives such as water, the emulsifier and the polymerization initiator are charged all at once as they are for polymerization. Otherwise, the monomers, water and the emulsifier may preliminarily be pre-emulsified using a stirring machine such as a homogenizer or a forced emulsifier, for the purpose of reducing the particle sizes of dispersed particles to improve stability of the dispersion and improving physical properties of the coating film such as gloss, and then the initiator is added for polymerization. Further, the monomers may be added dividedly or continuously, and in such a case, the monomer composition may vary.

By the above emulsion polymerization, a dispersion comprising particles of the copolymer (A) dispersed in an aqueous medium is obtained. The aqueous dispersion may be used as it is or by adding an after-mentioned optional additive to fix the glass fibers thereby to obtain a fixed glass fiber cloth.

As the above-mentioned optional additive to be used for the aqueous dispersion, the following additives which are usually used for production of a water-dispersed coating liquid may be used. An acrylic or silicone surface adjuster or the above-described emulsifier (for the purpose of accelerating infiltration of the dispersion into the glass fiber bundle); a high boiling point organic solvent which can be used as a film formation aid such as Texanol (tradename, manufactured by Eastman Chemical Company) or an alkyl glycol ether (for the purpose of accelerating fusion of dispersed particles); an urethane associative thickener (for the purpose of increasing the amount of a water dispersion attached to the glass fibers); a preservative for an aqueous dispersion; a silane coupling agent (for the purpose of improving adhesive properties to a fluororesin film); and an antifoaming agent (for the purpose of improving immersion handling efficiency).

The fixed glass fiber cloth to be used in the present invention can be produced by fixing glass fibers by a binder containing the above copolymer (A).

Specifically, it can be produced by a step of preparing, using glass fibers, a sheet in the form of a mesh (in a state where there is a portion where glass fibers intersect with one another and a portion (an air gap portion) where there are no glass fibers as observed from above) (hereinafter such a sheet will be referred to as a mesh product), and a step of impregnating the mesh product with a solution or dispersion of the copolymer (A), taken out the mesh product and drying it (hereinafter sometimes referred to as a fixing step). The fixing step may be carried out once or may be carried out two or more times.

The fiber thickness of the glass fibers is preferably from 5 to 3,000 tex (g/1,000 m), more preferably from 20 to 1,000 tex, considering the transparency, strength, the thickness and the like of a laminated sheet to be obtained. This fiber thickness is a value measured in accordance with JIS L0101.

The mesh product has an open area ratio (the ratio (%) of an area of the air gap portion in the total area of the mesh product) of preferably at least 30%, more preferably at least 50%. The higher the open area ratio of the mesh product, the more the transparency of the fixed glass fiber cloth will improve, and the more the transparency of the laminated sheet to be obtained will improve.

Further, the open area ratio is preferably at most 95%, more preferably at most 90%, considering the strength of a laminated sheet to be obtained.

The open area ratio of the mesh product can be obtained by the following procedure.

$$\text{Open area ratio} = \frac{\text{Distance between external sides of fibers (warp)} \times \text{Distance between external sides of fibers (woof)}}{\text{Distance between centers of fibers (warp)} \times \text{Distance between centers of fibers (woof)}} \times 100$$

The open area ratio can be adjusted by adjusting the fiber thickness of the glass fibers used, the number of fibers twisted, or the like. For example, in a case where a woven fabric is prepared using glass fibers each having a fiber thickness of from 5 to 3,000 tex as the warp and the woof as the mesh product, the numbers of the fibers twisted in the lengthwise direction and in the lateral direction are preferably from 0.5 to 100 fibers/inch (2.54 cm), respectively, more preferably from 1 to 50 fibers/inch.

The concentration (solid content concentration) of the copolymer (A) in the solution or the dispersion with which the mesh product is impregnated is preferably from 10 to 75 mass %, more preferably from 20 to 60 mass %. If it is at least 75 mass %, affinity with the mesh product tends to be poor, and if it is at most 10 mass %, no sufficient amount of the binder attached will be achieved.

The impregnation time of the mesh product varies depending on the solid content concentration, the temperature, etc. of the solution or the dispersion, and it is usually preferably from 0.01 to 10 minutes.

The drying conditions are not particularly limited, and preferred are conditions under which the ratio of the solution or the solvent in the dispersion attached to the glass fibers by immersion can be decreased to less than 1 mass % are preferred.

In a case where a conventional binder is used, if drying is carried out under drying conditions under which the ratio of the solvent is decreased to less than 1 mass %, bonding properties of the binder will be lost, and the binder will not sufficiently function, and the intersection points of the glass fibers will not be fixed. Accordingly, although there is no problem in the case of a cloth with a low open area ratio, in a case where a cloth with a relatively large air gap portion, such as one with an open area ratio of at least 30%, is to be obtained, since the number of intersection points of the glass fibers is small, it is difficult to maintain the shape of the cloth even after drying.

On the other hand, the copolymer (A) to be used for the present application maintains sufficient adhesive properties even when dried under the above drying conditions, and the shape of the cloth (fixed glass fiber cloth) is maintained even after drying. Accordingly, the transparency of the fixed glass fiber cloth and thus the transparency of a laminated sheet can be improved. Further, the copolymer (A) is excellent also in durability, and its function as the binder is maintained over a long period of time, and such contributes to improvement in the durability of a laminated sheet.

Specific drying conditions are properly set depending on the type of the solvent used. For example, in a case where an aqueous medium such as water is used, the drying temperature is preferably from 80 to 200° C., more preferably from 100 to 150° C., and the drying time is preferably from 2 to 60 minutes, more preferably from 10 to 40 minutes.

The ratio of the solution or the solvent in the dispersion attached to the glass fibers can be confirmed by dividing the difference in the weight as between before and after the fixed glass fiber cloth is held in a hot air dryer at 150° C. for 60 minutes, by the weight after heating.

In the fixed glass fiber cloth thus obtained, the intersection points of the glass fibers are fixed by the copolymer (A), and a portion where there are no glass fibers constitutes an air gap.

The open area ratio of the fixed glass fiber cloth is the same as the open area ratio of the mesh product used, and is preferably at least 30%, more preferably at least 50%. Further, it is preferably at mot 95%, more preferably at most 90%.

In the present invention, the amount of the binder in the glass fibers (calculation method will be described hereinafter) is preferably from 5 to 30 mass %, more preferably from 8 to 16 mass %. If the amount of the binder in the glass fibers is too large, the air gap may be clogged, and if the amount is too small, the adhesive properties may be insufficient.

The fluororesin film is preferably a film comprising at least one fluororesin selected from the group consisting of an ethylene/tetrafluoroethylene copolymer, a tetrafluoroethylene/perfluoro(alkyl vinyl ether) copolymer, a tetrafluoroethylene/hexafluoropropylene copolymer, a polyvinylidene fluoride, a polyvinyl fluoride, a tetrafluoroethylene/hexafluoropropylene/vinylidene fluoride copolymer, polychlorotrifluoroethylene, an ethylene/chlorotrifluoroethylene copolymer and a tetrafluoroethylene/2,2-bistrifluoromethyl-4,5-difluoro-1,3-dioxol copolymer, in view of high light transmittance in the visible region.

In the present invention, the fluororesin film particularly preferably comprises at least one fluororesin selected from the group consisting of an ethylene/tetrafluoroethylene copolymer, a tetrafluoroethylene/perfluoro(alkyl vinyl ether) copolymer, a tetrafluoroethylene/hexafluoropropylene copolymer, a polyvinylidene fluoride, a polyvinyl fluoride, a tetrafluoroethylene/hexafluoropropylene/vinylidene fluoride copolymer and polychlorotrifluoroethylene.

Among them, at least one member selected from the group consisting of an ethylene/tetrafluoroethylene copolymer, a tetrafluoroethylene/perfluoro(alkyl vinyl ether) copolymer and a tetrafluoroethylene/hexafluoropropylene copolymer is preferred, and an ethylene/tetrafluoroethylene copolymer is particularly preferred.

The fluororesin film may optionally contain, in addition to the fluororesin, an additive such as a coloring pigment such as an organic pigment or an inorganic pigment, a dye, an ultraviolet absorber or an infrared absorber.

The fluororesin film may be a single fluororesin layer or may be a laminated film comprising a plurality of fluororesin layers differing in the composition.

The fluororesin film may be commercially available one, or may be prepared by using the above-described fluororesin by a known molding method (such as extrusion).

The thickness of the fluororesin film is preferably from 24 to 1,000 μm, more preferably from 50 to 400 μm. If the thickness is at least 24 μm, favorable handling efficiency will be obtained, and the mechanical strength of a laminated sheet to be obtained will be sufficient. Further, when it is at most 1,000 μm, the transparency of a laminated sheet to be obtained will be high, and handling efficiency such as flexibility will improve.

The structure of the laminated sheet of the present invention is not particularly limited, and it may be a two-layer structure such that one fluororesin film and one fixed glass fiber cloth are laminated on each other, or may be a three-layer structure or more such that the fixed glass fiber cloth is disposed between two or more fluororesin films.

The three-layer structure or more is preferred since the outermost layers at both sides of the laminated sheet are fluororesin films, whereby favorable durability, firmness of the laminated film, stain resistance, etc. will be obtained. Particularly, since the transparency is higher when the number of lamination is smaller, the structure of the laminated sheet is preferably such a structure that fluororesin films are disposed on both sides of one fixed glass fiber cloth.

The laminated sheet of the present invention is produced by laminating the fixed glass fiber cloth and the fluororesin film under heating.

As the lamination method, a known lamination method (for example, a heat roll lamination method of passing materials to be laminated through a pair of heated rollers and pressing the materials; an extrusion lamination method of laminating films immediately after extruded by a pair of pressurized rollers; a flat pressing method of heating and pressurizing the materials between heated hot flat plates; a vacuum lamination method of drawing a vacuum in the cloth and keeping a pressurized state by the atmospheric pressure from both sides of the film, followed by heating) may be employed.

In a case where as the laminated sheet, a laminated sheet having a structure such that a fixed glass fiber cloth is disposed between two or more fluororesin films is to be produced, the fixed glass fiber cloth is disposed between the fluororesin films, followed by lamination by means of the above method. Among them, the vacuum lamination method is preferred, and as the vacuum lamination method, such a method is preferably employed that the pressure between the fluororesin films is reused to an absolute pressure of at most 0.03 MPa, more preferably at most 0.01 MPa, and the fluororesin films and the fixed glass fiber cloth are bonded and heated in this state. The vacuum lamination method has such an advantage that the cloth is less likely to deform as it is not drawn e.g. between rolls.

The heating temperature in lamination under heating/pressurization varies depending upon the type of the fluororesin used, and it is preferably from 150 to 400° C., more preferably from 180 to 380° C.

The heating time varies depending on the heating temperature, and it is preferably from 0.01 to 15 minutes, more preferably from 0.02 to 10 minutes, particularly preferably from 1 to 3 minutes.

The thickness of the laminated sheet of the present invention is preferably at most 1,000 μm, more preferably at most 400 μm, considering transparency, processability, etc. Further, considering the strength, etc. it is preferably at least 24 μm, more preferably at least 50 μm.

The laminated sheet of the present invention preferably has a light transmittance (visible light transmittance) in the visible region of at least 30% as measured in accordance with JIS R3106, and a tensile break strength of at least 80 MPa as measured in accordance with JIS K7127. Such a laminated sheet is useful for various applications such as a covering material for agricultural greenhouses, other film structures, etc.

The visible light transmittance is more preferably at least 50%. The upper limit is not particularly limited and may be 100%. However, considering practical strength, etc. it is preferably at most 95%, more preferably at most 90%.

The tensile break strength is more preferably at least 100 MPa. There is no upper limit.

The visible light transmittance and the tensile break strength of the laminated sheet can be adjusted by adjusting the open area ratio of the woven or nonwoven fabric used, the fiber thickness of the glass fibers used for the woven or nonwoven fabric, the type and the thickness of the fluororesin film, etc.

For example, The higher the open area ratio of the woven or nonwoven fabric, or the thinner the fiber thickness of the glass fibers, the more the visible light transmittance of the laminated sheet will improve. On the contrary, for example, the lower the open area ratio of the woven or nonwoven fabric, or the thicker the fiber thickness of the glass fibers, the more the tensile break strength of the laminated sheet will improve.

In order to obtain a laminated sheet having the above visible light transmittance of at least 30% and having the above tensile break strength of at least 80 MPa, for example, it is preferred that the fiber thickness of the glass fibers is from 5 to 3,000 tex, and the open area ratio of the woven or nonwoven fabric is at least 30%.

EXAMPLES

Now, the present invention will be described in further detail below. However, it should be understood that the present invention is by no means restricted to such specific Examples.

A vertical cross-section schematically illustrating a fixing frame used in lamination of films in Examples and Comparative Examples is shown in FIG. 1. This fixing frame schematically comprises an upper frame 4 in the form of a plate, and a lower frame 6 disposed to face the upper frame 4. On a portion of the upper frame 4 to be in contact with the lower frame 6, and on a portion of the lower frame 6 to be in contact with the upper frame 4, packings 5 and 7 are disposed, respectively.

Figure 2:
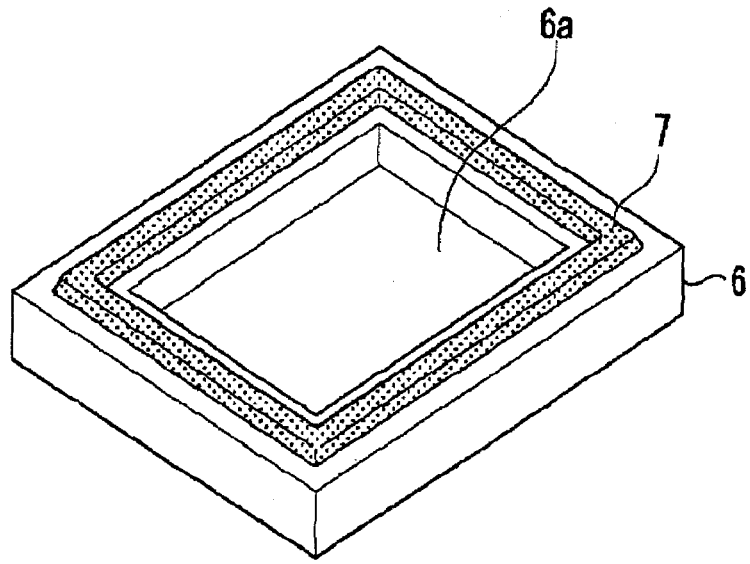
FIG. 2 is a perspective view of a lower frame 6 of the fixing frame shown in FIG. 1.

On the surface of the upper frame 4 side of the lower frame 6, as shown in FIG. 2, a rectangular concave 6a is formed. Further, on the lower frame 6, a piping 8 which connects the concave 6a and the outside of the lower frame 6 is provided, so that the pressure in the concave 6a can be reduced by a vacuum pump (not shown) by means of the piping 8.

Preparation Example 1

Preparation of Aqueous Dispersion of Fluorocopolymer 1

To a stainless steel pressure-resistant container having a capacity of 2,800 mL, 1,012 g of deionized water, 1.6 g of potassium carbonate, 12 g of cyclohexyl vinyl ether (CHVE), 274 g of ethyl vinyl ether (EVE), 167 g of cyclohexanedimethanol monovinyl ether (CHMVE), 28 g of an ethylene oxide adduct of cyclohexanedimethanol monovinyl ether (CMEOVE), 572 g of chlorotrifluoroethylene (CTFE), 53 g of polyoxyethylene alkyl ether (tradename, Newcol 1120, manufactured by NIPPON NYUKAZAI CO., LTD.) and 1.1 g of sodium lauryl sulfate were added, and while 25 g of a 0.5 mass % aqueous solution of ammonium peroxydisulfate (APS) was added, stirring was carried out at 50° C. for 24 hours. Then, the obtained aqueous dispersion was subjected to filtration through a stainless steel net with an aperture of 150 μm, to obtain an aqueous dispersion (solid content concentration: 50 mass %) of a fluoropolymer 1 having an average particle size of 150 nm and a hydroxyl value of 54 mgKOH/g.

CMEOVE is a compound represented by the formula $CH_2=CH-O-CH_2\text{-cyclo}C_6H_{10}-CH_2-O-(CH_2CH_2O)_nH$ (wherein n is the average number of mols of added ethylene oxide) having an average molecular weight of 830.

Preparation Example 2

Preparation of Aqueous Dispersion of Fluorocopolymer 2

An aqueous dispersion (solid content concentration: 50 mass %) of a fluorocopolymer 2 having an average particle size of 150 nm and a hydroxyl value of 5 mgKOH/g was obtained in the same manner as in Preparation Example 1 except that to a stainless steel pressure-resistant container having a capacity of 2,800 mL, 1,002 g of deionized water, 2.6 g of potassium carbonate, 338 g of CHVE, 187 g of 2-ethylhexyl vinyl ether (2EHVE), 28 g of CHMVE, 17 g of CMEOVE, 472 g of CTFE, 25 g of a 2% aqueous solution of APS, 53 g of polyoxyethylene alkyl ether (tradename, Newcol 1120, manufactured by NIPPON NYUKAZAI CO., LTD.) and 1.1 g of sodium lauryl sulfate were added, and 25 g of a 2 mass % aqueous solution of APS was added.

Preparation Example 3

Preparation of Aqueous Dispersion of Fluorocopolymer 3

While 915 g of xylene, 258 g of ethanol, 6.7 g of potassium carbonate, 81 g of CHVE, 46 g of EVE, 99 g of hydroxybutyl vinyl ether (HBVE), 513 g of CTFE, and 5.6 g of a 50% xylene solution of perbutyl perpivalate (PBPV) were charged to a stainless steel pressure-resistant container having a capacity of 2,800 mL, stirring was carried out at 65° C. for 20 hours. Then, ethanol was distilled off from the obtained resin solution, and insoluble matters were removed by filtration. Then, xylene was distilled off by a thin film evaporator to dry the polymer, thereby to obtain a solid fluorocopolymer 3 having a solid content concentration of 99%, a hydroxyl value of 100 mgKOH/g and a number average molecular weight of 6,500. Methyl ethyl ketone was added to the solid fluorocopolymer 3 to prepare a solution of a fluorocopolymer 3 having a concentration of 60%.

To 300 parts of the solution, 19.3 parts of a 20 mass % acetone solution of succinic anhydride and 0.072 part of triethylamine as a catalyst were added, followed by reaction at 70° C. for 6 hours to esterify the fluorocopolymer. The infrared absorption spectrum of the reaction liquid was measured, whereupon the characteristics absorptions (1,850 $cm^{-1}$, 1,780 $cm^{-1}$) of succinic anhydride measured before the reaction disappeared after the reaction, and absorptions of carboxylic acid (1,710 $cm^{-1}$) and an ester (1,735 $cm^{-1}$) were observed. The fluorocopolymer after esterification had an acid value of 12 mgKOH/g and a hydroxyl value of 86 mgKOH/g. Based on these acid value and hydroxyl value, about 2.4 mol % among 20 mol % of the hydroxybutyl vinyl ether units were esterified.

Then, to 100 parts of the fluorocopolymer after esterification, 2.73 parts of triethylamine were added, followed by stirring at room temperature for 20 minutes to neutralize a part of carboxylic acid, and 180 parts of deionized water was gradually added, whereby about 1.7 mol % among the units (about 2.4 mol %) esterified and having carboxyl groups introduced were neutralized.

Finally, acetone and methyl ethyl ketone were distilled off under reduced pressure. Further, about 90 parts of deionized water was added to obtain an aqueous dispersion (solid content concentration: 40 mass) of a fluorocopolymer 3 having a particle size of 170 nm.

Example 1

On a flat plate having inner dimensions of 20 cm square and outer dimensions of 30 cm square and having a hole at its center, threads (fiber thickness: 100 tex) comprising a plurality of glass fiber bundles with a single fiber diameter of 12 μm were lined up in a number of 5 threads per inch (2.54 cm) in the lengthwise and crosswise directions, and they were fixed on the flat plate by an adhesive tape to prepare a mesh product with an open area ratio of 60%. The mesh product together with the flat plate was put in a bat filled with the aqueous dispersion of the fluorocopolymer 2 at room temperature for 3 minutes.

Then, the mesh product together with the flat plate was taken out from the bat, lightly shaken to remove the extra liquid, and held in a circulating hot air dryer set at 150° C. for 20 minutes and dried.

In the obtained dried product, the intersection points of the respective threads were fixed by the binder, and the shape of the dried product was sufficiently maintained even if it is peeled from the flat plate.

A part of the fixed glass fiber cloth thus obtained was sampled to carry out the following evaluations. The results are shown in Table 1.

(Amount of Binder)

To calculate the amount of binder, the fixed glass fiber cloth was heated as follows.

Using a thermogravimetric differential thermal analyzer (TG-DTA; manufactured by Seiko Instruments Inc.), the fixed glass fiber cloth was heated at a rate of 10° C. per minute in the air up to 450° C., kept at the temperature for 60 minutes and then cooled to 25° C.

The masses before and after heating the fixed glass fiber cloth were measured, and from the measured values, the 450° C. heat loss (%) was determined from the following formula. The heat loss (%) was regarded as the amount (mass %) of the binder.

Heat loss (%)={(mass before heating−mass after heating)/mass before heating}×100

(Flex Resistance)

The front surface and the back surface of a 20 cm square fixed glass fiber cloth were wound around the outer periphery of a cylinder having a diameter of 75 mm once each, whereupon presence or absence of peeling of the intersection points of the glass fibers (hereinafter referred to as mesh fixed points) was visually judged and evaluated on the basis of the following evaluation standards.

(Evaluation Standards)

◯: No peeling, ×: at least one peeling observed.

(Failure in Bonding Between Binders)

Two fixed glass fiber clothes were overlaid and pressed under a static load of 300 g/cm² and held in a hot air constant temperature oven at 40° C. for 24 hours, and then the overlaid two fixed glass fiber clothes were peeled off. A case where there was resistance when the two fixed glass fiber clothes were peeled by adhesion of the respective binders is judged "adhesive properties confirmed" and further, presence or absence of the peeling of the mesh fixed points of each fixed glass fiber cloth was visually confirmed and evaluated as the failure in bonding between binders based on the following evaluation standards.

(Evaluation Standards)

◯: Adhesive properties confirmed, but there is no peeling of the mesh fixed points.

Δ: Adhesive properties confirmed, and slight peeling of the mesh fixed points observed.

×: Adhesive properties confirmed, and 10% or more of the mesh fixed points were peeled.

Then, two extruded films made of an ethylene/tetrafluoroethylene copolymer (ETFE) (tradename, LM-ETFE film, manufactured by Asahi Glass Company, Limited, thickness: 50 μm) (hereinafter referred to as ETFE film 1 and ETFE film 2) were prepared.

Figure 3:
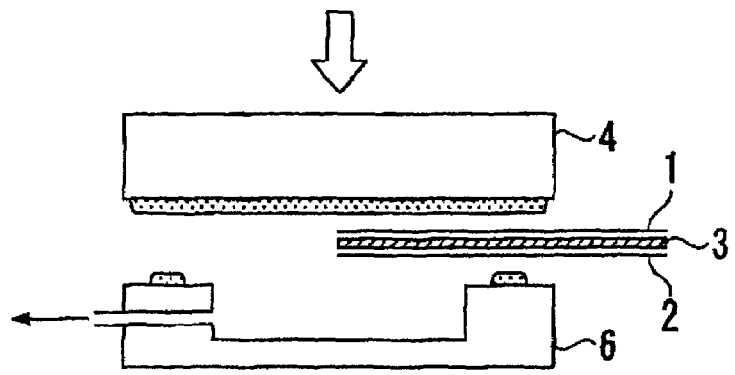
FIG. 3 is a drawing to illustrate a lamination method.

Then, between the ETFE films 1 and 2, the above-obtained fixed glass fiber cloth 3 was sandwiched, and the sandwich was set as shown in FIG. 3, between an upper frame 4 and a lower frame 6 of a fixing frame shown in FIG. 1, and the outer peripheral portion of the film was fixed by sending the upper frame 4 down. Then, by vacuum suction by a vacuum pump through a piping 9, the pressure between the two ETFE films 1 and 2 was reduced to $2.0 \times 10^{-3}$ Pa or below. The fixing frame in this state was held in a hot air dryer at 250° C. for 10 minutes and then taken out and air-cooled. When the film surface temperature reached 50° C. or below, the film was cut along the outer periphery of a concave 6a of the lower frame 6 to obtain a laminated sheet comprising the fixed glass fiber cloth 3 and the ETFE films 1 and 2 laminated on both sides of the cloth 3. The obtained laminated sheet had a thickness at the intersection points of from 300 to 350 μm and a thickness at the other area of 100 μm.

The laminated sheet thus obtained was subjected to the following evaluation for weather resistance. The results are shown in Table 1.

(Weather Resistance)

The laminated sheet was held in an accelerated weather resistance test apparatus (apparatus name: Super Sunshine Weather Meter, manufactured by Suga Test Instruments Co., Ltd.) for 2,000 hours, whereupon the outer appearance was visually confirmed and evaluated on the basis of the following evaluation standards.

(Evaluation Standards)

○: No change.

x: Coloring observed.

The laminated sheet had a visible light transmittance of 59.3% as measured in accordance with JIS R3106, and a tensile break strength of 105 MPa as measured in accordance with JIS K7127.

Example 2

A fixed glass fiber cloth was prepared and a laminated sheet was obtained in the same manner as in Example 1 except that the aqueous dispersion of the fluorocopolymer 2 was changed to the aqueous dispersion of the fluorocopolymer 1. The obtained laminated sheet had a thickness at the intersection points of from 300 to 350 μm and a thickness at the other area of 100 μm.

Further, the fixed glass fiber cloth and the laminated sheet were evaluated in the same manner as in Example 1. The results are shown in Table 1.

Example 3

A fixed glass fiber cloth was prepared and a laminated sheet was obtained in the same manner as in Example 1 except that the aqueous dispersion of the fluorocopolymer 3 was changed to the aqueous dispersion of the fluorocopolymer 1. The obtained laminated sheet had a thickness at the intersection points of from 300 to 350 μm and a thickness at the other area of 100 μm.

Further, the fixed glass fiber cloth and the laminated sheet were evaluated in the same manner as in Example 1. The results are shown in Table 1.

Comparative Example 1

A fixed glass fiber cloth was prepared in the same manner as in Example 1 except that the aqueous dispersion of the fluorocopolymer 2 was changed to a N-methylpyrrolidone solution of polyvinylidene fluoride (hydroxyl value: 0 mgKOH/g) (tradename: KF Polymer L #1120, manufactured by KUREHA CORPORATION, solid content concentration: 11.3 mass %), that immersion in the solution and drying were repeated three times, and that the drying temperature was 220° C., and evaluated in the same manner as in Example 1. The results are shown in Table 1.

However, the fixed glass fiber cloth could not maintain the shape as a cloth when handled due to insufficient fixing power, and evaluation on failure in bonding between binders, preparation and evaluation of a laminated sheet were difficult.

Comparative Example 2

A fixed glass fiber cloth was prepared and a laminated sheet was obtained in the same manner as in Example 1 except that the aqueous dispersion of the fluorocopolymer 2 was changed to an acrylic resin emulsion (tradename: AG-100, manufactured by SHOWA HIGH POLYMER CO., LTD., solid content concentration: 50 mass %).

Further, evaluation of the fixed glass fiber cloth and the laminated sheet was carried out in the same manner as in Example 1. The results are shown in Table 1.

TABLE 1

|  | Ex. 1 | Ex. 2 | Ex. 3 | Comp. Ex. 1 | Comp. Ex. 2 |
|---|---|---|---|---|---|
| Visible light transmittance (%) | 59.3 | 60.1 | 59.5 | 58.0 | 58.1 |
| Amount of binder (%) | 12 | 13 | 12 | 13 | 14 |
| Flex resistance | ○ | ○ | ○ | X | ○ |
| Failure in bonding between binders | ○ | ○ | ○ | Evaluation impossible | ○ |
| Weather resistance | ○ | ○ | ○ | Evaluation impossible | X |

As shown in results in Table 1, in Examples 1 to 3, favorable results were obtained in all evaluations for flex resistance of the fixed glass fiber cloth, failure in bonding between binders and weather resistance of the laminated sheet.

Industrial Applicability

The laminated sheet of the present invention comprises a glass fiber cloth which has high transparency, which withstands long outdoor use and which is free from deformation of the cloth even in a step of bonding the cloth to a fluororesin film. Accordingly, it is useful as a covering material for agricultural greenhouses and other film structure, such as a roof material for large-scale greenhouses and atria, an exterior wall and a roof material for sports facilities, etc.

The entire disclosure of Japanese Patent Application No. 2007-040615 filed on Feb. 21, 2007 including specification, claims, drawings and summary is incorporated herein by reference in its entirety.

What is claimed is:

1. A laminated sheet comprising a woven or nonwoven fabric comprising glass fibers fixed by a binder, and a fluororesin film laminated on each other, wherein the binder contains a copolymer (A) having repeating units (a1) based on at least one fluoromonomer selected from the group consisting of tetrafluoroethylene, chlorotrifluoroethylene and hexafluoropropylene, and repeating units (a2) based on at least one non-fluoromonomer selected from the group consisting of a vinyl ether, a vinyl ester, an isopropenyl ether, an isopropenyl ester, an allyl ether and an allyl ester.

2. The laminated sheet according to claim 1, wherein the fiber thickness of the glass fibers is from 5 to 3,000 tex, and the open area ratio of the woven or nonwoven fabric is at least 30%.

3. The laminated sheet according to claim 1, wherein the fluororesin film comprises at least one fluororesin selected from the group consisting of an ethylene/tetrafluoroethylene copolymer, a tetrafluoroethylene/perfluoro(alkyl vinyl ether) copolymer, a tetrafluoroethylene/hexafluoropropylene copolymer, polyvinylidene fluoride, polyvinyl fluoride, a tetrafluoroethylene/hexafluoropropylene/vinylidene fluoride copolymer and polychlorotrifluoroethylene.

4. The laminated sheet according to claim 1, wherein the fluororesin film is an ethylene/tetrafluoroethylene copolymer.

5. The laminated sheet according to claim 1, which has a light transmittance in the visible region of at least 30%.

6. The laminated sheet according to claim 1, wherein the hydroxyl value or the acid value as calculated as mg of potassium hydroxide consumed per 1 g of the copolymer (A) is from 2 to 60 mgKOH/g.

7. The laminated sheet according to claim 1, wherein the ratio of the repeating units (a1) in the copolymer (A) is from 30 to 70 mol % based on the total amount of all the repeating units constituting the copolymer (A).

8. The laminated sheet according to claim 1, wherein the ratio of the repeating units (a2) in the copolymer (A) is from 30 to 70 mol % based on the total amount of all the repeating units constituting the copolymer (A).

9. The laminated sheet according to claim 1, wherein the amount of the binder in the glass fibers is from 5 to 30 mass %.

10. The laminated sheet according to claim 1, which has a thickness of from 24 to 1,000 μm.

11. The laminated sheet according to claim 1, which is produced by laminating the woven or nonwoven fabric and the fluororesin film on each other under heating.

12. The laminated sheet according to claim 11, wherein the heating temperature is from 150 to 400° C.

* * * * *